O. RANDOLPH.
MOVABLE CREST DAM.
APPLICATION FILED DEC. 29, 1916.
1,263,109.
Patented Apr. 16, 1918.
2 SHEETS—SHEET 1.
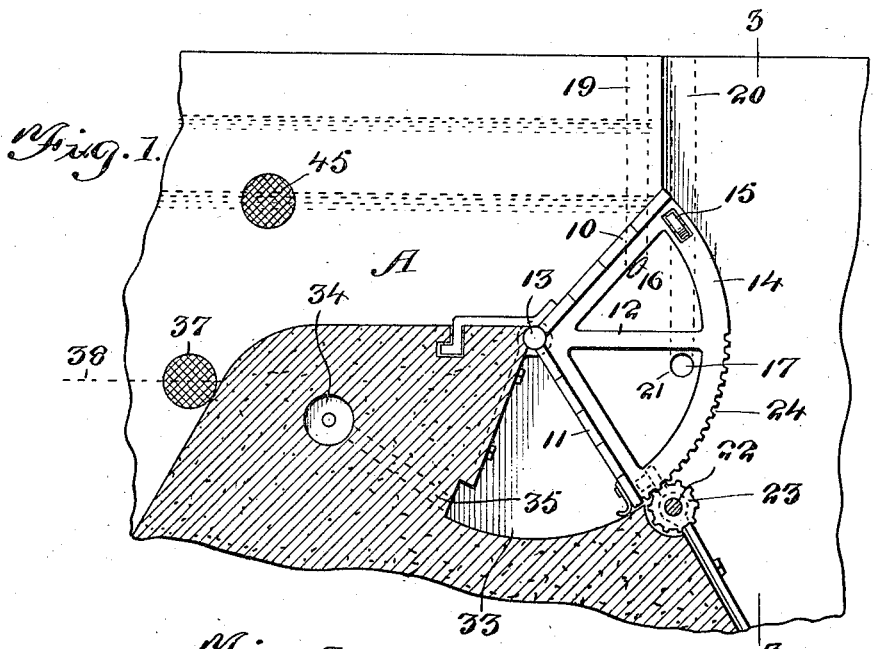
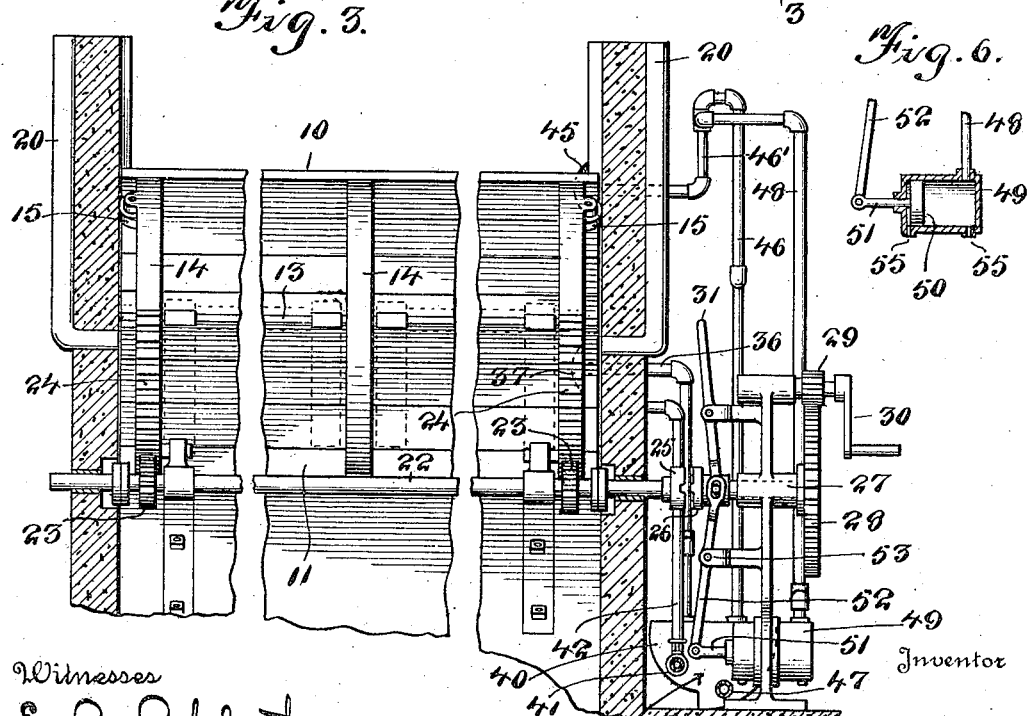
Witnesses
E. R. Ruppert
Edward Yeager
Inventor
Orrin Randolph
By Victor J. Evans
Attorney

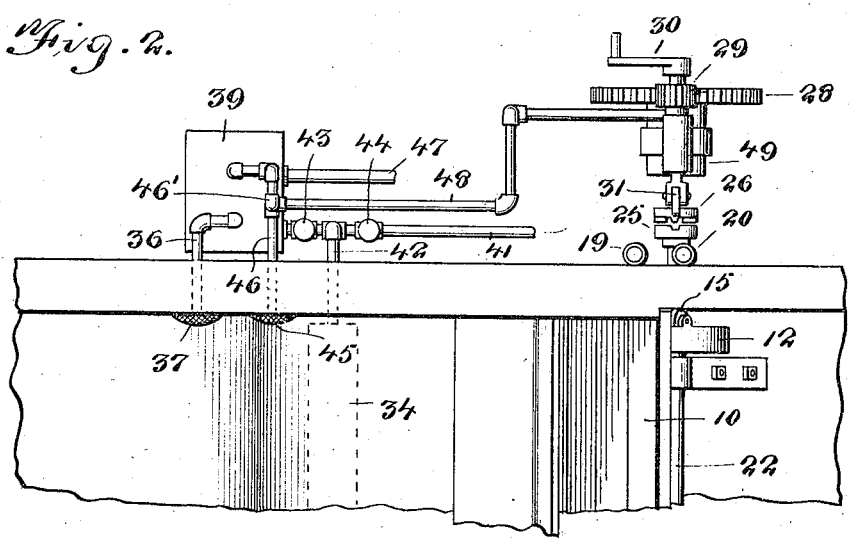
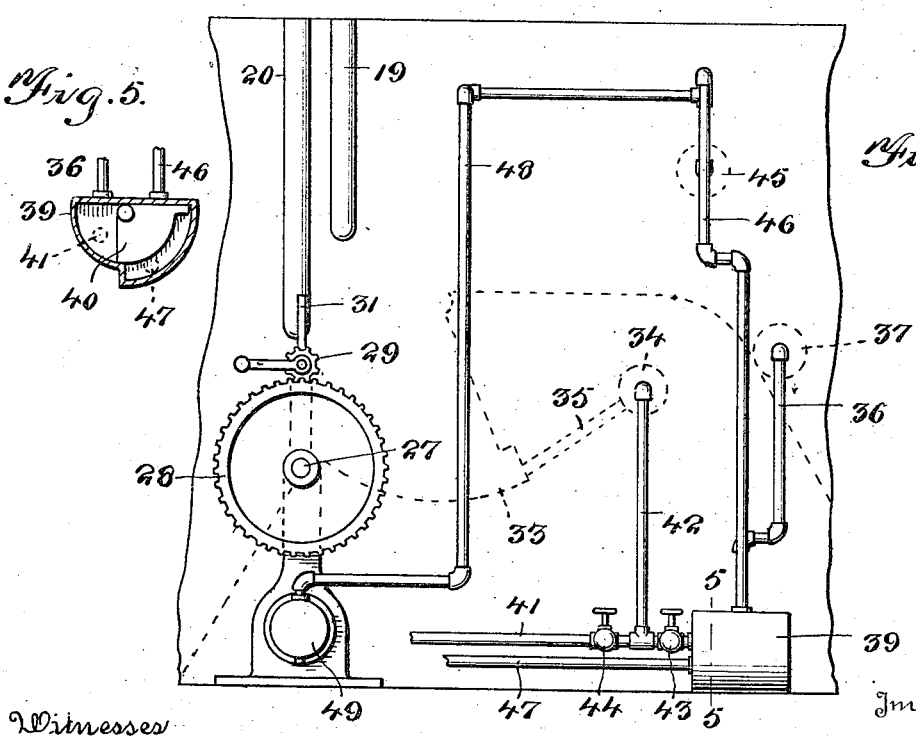

UNITED STATES PATENT OFFICE.

ORRIN RANDOLPH, OF LAKE WORTH, FLORIDA.

MOVABLE-CREST DAM.

1,263,109.   Specification of Letters Patent.   Patented Apr. 16, 1918.

Application filed December 29, 1916. Serial No. 139,608.

*To all whom it may concern:*

Be it known that I, ORRIN RANDOLPH, a citizen of the United States, residing at Lake Worth, in the county of Palm Beach and State of Florida, have invented new and useful Improvements in Movable-Crest Dams, of which the following is a specification.

This invention comprehends the provision of a movable crest dam designed with a view of maintaining the water in the forebay above the dam at any desired elevation. The invention is especially useful on drainage canals where a necessity arises to waste the flood flow and conserve the remaining waters for purposes of navigation or to prevent overdrainage of the land. It is also equally as useful in controlling the elevation of the water for purposes of hydroelectric development and for irrigation projects.

In carrying out the invention I provide a construction whereby the dam or gate may be manually or automatically controlled in its operation, and locked in any desired position.

An important object of the invention resides in a construction for which a slow motion is provided which prevents undue jarring of the dam, and also unnecessary water disturbances below the dam which follows when dams are suddenly opened, as well as the creation of an abnormal head of water above the dam when the water is suddenly cut off.

The nature and advantages of the invention will appear when the following description is read in connection with the accompanying drawing, the invention residing in the construction, combination and arrangement of parts as claimed.

In the drawing forming part of this specification like numerals of reference indicate similar parts in the several views and wherein:—

Figure 1 is a longitudinal vertical sectional view through the dam.

Fig. 2 is a fragmentary top plan view.

Fig. 3 is a sectional view taken on line 3—3 of Fig. 1.

Fig. 4 is a side elevation.

Fig. 5 is a sectional view taken on line 5—5 of Fig. 4.

Fig. 6 is a sectional view taken through the cylinder forming part of the clutch operating mechanism.

Before entering into a detail description of what is herein shown and described I desire to have it understood that the same merely illustrates the preferred embodiment of the invention to which I do not limit myself, and that such changes may be resorted to when desired as fall within the scope of what is claimed.

The dam itself indicated generally at A is one form of the bear trap dam which is now used to a considerable extent. On the upper section of the dam wooden flash boards 10 are used to provide a water cut off, while on the lower section of the dam similar boards 11 are used for operating the gate in the manner to be hereinafter more fully described. These boards are carried by segments of a truss 12 which is hinged to a shaft 13 at the center of the segment. The segments 14 are equidistantly spaced from one another, while on the two outermost segments rollers 15 are journaled to engage the end walls of the structure, both to facilitate the operation of the dam as a unit, preventing lateral motion of the same as well as friction of the boards on the end walls of the structure. The upper and lower air chambers 16 and 17 respectively are provided in each end wall to prevent the formation of a vacuum under the waterfall, and these air chambers communicate with the atmosphere through passages 19 and 20 respectively. The upper air chamber is shaped so that when the dam is opened the water will not flow around the boards 10 and through the air space to the down stream side. In other words the air chamber 16 is constructed in oblong form radially parallel with the face of the dam and the width of this chamber is less than the width of the flash board so that no leakage of the water flows from the up stream to the down stream face of the dam when it is held opposite this air chamber. The lower chamber 17 has a circular opening 21 because the dam never moves by this chamber and there is no flow escapement to be prevented. The movable truss dam may be operated either by hand or by means of hydraulic pressure, and in the latter instance the hydraulic flow may be either hand controlled or automatic in its operation.

In order to control the dam by hand I preferably provide a shaft 22 located on the down stream side of the structure and provided with a cog wheel 23 arranged to mesh with the teeth 24 on the lower portion of the segment 14 of the dam. It is of course to be understood that the shaft 22 supports as many cog-wheels 23 as there are segments 14. One end of the shaft 22 supports a clutch member 25 which is adapted to coöperate with a similar member 26 fixed upon a shaft 27 disposed in axial alinement with the shaft 22 and normally spaced from the latter. The shaft 27 has fixed thereon a gear wheel 28 with which a smaller gear 29 meshes for rotating the large gear 28 upon rotation of the smaller gear 29 through the instrumentality of a crank handle 30. A lever 31 is connected with the clutch member 26 for throwing the latter into engagement with the clutch member 25, so that it is obvious when the respective clutch members are in engagement a rotation of the crank handle 30 will be sufficient to actuate the dam to either an open or closed position. As illustrated the lower section of the dam operates within a pocket 33 provided in the structure and which pocket communicates with a chamber 34 by means of a restricted passage 35 also formed in the structure.

With a view of providing means whereby the dam can be operated by hydraulic pressure, I employ an inlet pipe 36 having a screen covering 37, with the intake of the pipe located in the forebay at the low water mark indicated at 38. The pipe 36 communicates with a valve casing 39 in which is pivotally arranged a valve 40. A pipe 41 extends from the valve casing 39 to convey the water from the latter that is introduced thereinto through the pipe 36, while leading from the pipe 41 is a branch pipe 42 connected with the chamber 34, whereby communication is established between the latter and the valve casing 39. Manually operable valves 43 and 44 respectively are arranged within the pipe 41 and at opposite sides of the branch 42 and the purpose of these valves will be presently described. When it is desired to close the dam, the valve 44 is closed and the valve 43 opened which permits the water conveyed from the valve casing 39 through the pipe 41 to be introduced into the chamber 34 by way of the branch 42. The water subsequently passes from the chamber 34 into the pocket 33 beneath the lower section of the dam, and the water pressure beneath said section elevates the dam until the upper section 10 assumes a closed position. The water is allowed to enter the pocket 33 during the time the dam is in its closed position, as there is an outflow of this water from the pocket 33 through leakage around and under the sides and bottom of the dam. It is of course to be understood that the sides and bottom of the dam are spaced a slight distance from the adjacent surface of the structure. When it is desired to open the dam the valve 43 is closed with a view of permitting the water contained within the pocket 33 to drain off by leakage around and under the sides and bottom of the dam, and as the pressure is gradually decreased by this drainage, the dam gradually falls to its open position due to the weight of the water on the upper section 10. The slow motion which is provided for by this plan prevents undue jarring of the dam, and also unnecessary water disturbance below the dam which follows when dams are suddenly opened, as well as the creation of an abnormal head of water above the dam when the water is suddenly shut off. However if the leakage around and under the dam is too slow to allow the gate to open with sufficient rapidity, the valve 44 is opened to permit escape of water from the chamber 34 and which affords a more rapid opening of the dam.

As above stated I have also provided an automatic means for controlling the operation of the dam, in which instance a siphon intake is located with the highest part of the siphon at the elevation at which it is always desired that the dam shall be opened to permit of a maximum flow. The intake of the siphon is provided with a screen covering 45, and the water entering this siphon is conveyed through the pipe 46 into the valve casing 39. Normally the valve 40 assumes a position to establish communication between the pipe 36 and the pipe 41, but when the water is introduced into the casing 39 through the pipe 46, the valve 40 is swung upon its pivot to cut off the flow of water into the casing 39 through the pipe 36. The valve is maintained in this position as long as the siphon is in operation, but when the siphon ceases to operate the water pressure on the opposite side of the valve returns and holds the valve in its normal position. The siphon continues to operate until the water falls below the intake 45, as will be readily appreciated, so that the elevation of the water at which the dam shall be closed is fixed by the elevation of the siphon inlet, and the elevation at which it shall be opened is fixed by the elevation of the highest point of the siphon. The water introduced into the casing 39 through the pipe 46 is conveyed from the casing through a pipe 47.

If desired to maintain the dam in any of its elevated positions, it is only necessary to interlock the clutch members 25 and 26 respectively, the friction between the same being sufficient to hold the dam in its adjusted position. Should it happen that the dam is locked in any position at the time an automatic control takes place, I provide means whereby the dam is automatically unlocked. For this purpose I preferably lead a pipe 48 from adjacent the highest point of the pipe 46 to a cylinder 49 in which a piston 50 is arranged to reciprocate.

The piston rod 51 is connected with the adjacent extremity of a lever 52, which latter is fulcrumed at an intermediate point as at 53 and has its opposite extremity associated with the clutch member 26. Manifestly the pipe 48 establishes communication between the pipe 46 and the cylinder 49 so that when the automatic action or control is about to take place, a quantity of water is conveyed through the pipe 48 into the cylinder 49 at one side of the piston, moving the latter in the direction to effect a separation of the clutch engaging members 25 and 26 respectively, thereby unlocking the dam for operation at the proper time. A restricted air escape 55 is located on each side of the limiting positions of the piston to permit free action of the latter. The hand controlled mechanism, as well as the automatic means for operating the dam is arranged within a pit provided adjacent the dam as will be readily understood. The construction and arrangement of the dam is such that when the latter is opened there is no obstruction to material carried in suspension or floating, and that it may be closed to any desired position. The dam is designed so that when the water first passes over it, the water clears the bottom of the movable dam thus avoiding back pressure. The dam is adapted to a comparatively wide range of conditions of flow and it should be noted that the automatic control does not act until the water reaches an elevation some distance above the siphon intake, and this distance is adjustable by lengthening or shortening the short arm 46′ of the siphon. This siphon action is desirable because a lowering of the head of water above the dam follows the opening of the dam due to the change in hydraulic gradient of the canal to correspond with the new conditions of flow, and the length of the short arm of the siphon should be at least great enough to continue the action of the siphon after opening the dam.

What is claimed is:—

1. In a dam, the combination of a pivotally mounted gate for maintaining a body of water at a predetermined level, said gate including a segmental truss, angularly disposed gate sections mounted on the truss, the curved portion of said truss being provided with teeth, a shaft mounted for rotation, a gear fixed upon the shaft and meshing with said teeth whereby the gate is adjusted upon rotation of the shaft, means for rotating said shaft and further operating to maintain the gate in its adjusted position, and hydraulic means for automatically operating the gate at a predetermined interval independently of the last mentioned means.

2. In a dam, the combination of a pivotally mounted gate for maintaining a body of water at a predetermined level, said gate including a segmental truss, angularly disposed gate sections mounted on the truss, said truss having a toothed surface, a shaft mounted for rotation, a gear fixed upon the shaft and meshing with the toothed surface of the truss, a second shaft, coöperating clutch members carried by the adjacent extremities of said shafts, means for rotating said shafts as a unit when the clutch members are engaged to effect an adjustment of said gate, said clutch members further serving to hold the gate in one of its adjusted positions, and hydraulic means for automatically effecting a separation of said clutch members and the release of said gate to permit the latter to automatically assume an opened position.

3. In a dam, the combination of a pivotally mounted gate for maintaining a body of water at a predetermined level, said gate including angularly disposed connected sections, a pit adapted to receive one of said sections when the gate is depressed to an opened position, a valve casing, a water inlet pipe communicating with said casing, a second pipe establishing communication between the casing and the pit for conveying water into the latter to elevate the gate to a closed position, a valve arranged within the casing, and means for automatically operating the valve at a predetermined interval to cut off the flow of water into the casing through said inlet pipe, and means for regulating the escape of water from the pit to allow the gate to gradually assume an opened position.

4. In a dam, the combination of a pivotally mounted gate for maintaining a body of water at a predetermined level, said gate including angularly disposed connected sections, a pit adapted to receive one of said sections when the gate is opened, a valve casing, a water inlet pipe communicating with the casing, a second pipe establishing communication between the casing and the gate to convey water into the latter, whereby said gate is automatically elevated to a closed position, a valve operable within the casing, means for automatically operating the valve at a predetermined interval to cut off the flow of water thereinto through said inlet pipe, a valve in the said second mentioned pipe for controlling the communication between the casing and said pit, and means for controlling the escape of water from said pit to allow the gate to assume an opened position with more or less rapidity.

5. In a dam, the combination of a pivotally mounted gate for maintaining a body of water at a predetermined level, said gate including angularly disposed connected sections, a pit adapted to receive one of said sections when the gate is depressed to an opened position, a valve casing, a water inlet pipe communicating with the casing, a second pipe establishing communication between said casing and the pit to convey water into the latter whereby the gate is automatically elevated to a closed position, a valve arranged within the casing for cutting off the flow of water thereinto, hydraulic means automatically operating the valve, means for controlling the communication between the casing and said pit, and means for regulating the escape of water from the pit to allow the gate to gradually assume an opened position.

6. In a dam, the combination of a pivotally mounted gate for maintaining a body of water at a predetermined level, said gate including angularly disposed connected sections, a pit adapted to receive one of said sections when the gate is opened, a valve casing, a water inlet pipe communicating with the casing, a second pipe establishing communication between the casing and said pit for introducing water into the latter, whereby said gate is automatically elevated to a closed position, a valve within the casing, a second water inlet pipe communicating with the casing to introduce water thereinto at a predetermined interval for automatically operating said valve to cut off communication between the casing and the first mentioned water inlet pipe, a discharge pipe leading from the casing and coöperating with the second mentioned inlet pipe, and means for regulating the escape of water from the pit to allow the gate to assume an opened position.

7. In a dam, the combination of a pivotally mounted gate for maintaining a body of water at a predetermined level, hydraulic means for automatically operating the gate, a shaft mounted for rotation, a gear fixed upon the shaft and coöperating with the gate to effect an adjustment of the latter upon rotation of said shaft, a second shaft, coöperating clutch members on the adjacent extremities of said shafts whereby said shafts are rotated as a unit, manually operable means for rotating the second mentioned shaft, said clutch members serving to hold the gate fixed in its adjusted position, and hydraulic means for automatically disconnecting the clutch at a predetermined time to permit of an automatic operation of the gate.

8. In a dam, the combination of a pivotally mounted gate for maintaining a body of water at a predetermined level, said gate including angularly disposed connected sections, a pit adapted to receive one of said sections when the gate is lowered to an opened position, a valve casing, a water inlet pipe communicating with the casing, a second pipe establishing communication between the casing and the pit to convey water to the latter, whereby the gate is automatically elevated to a closed position, a second water inlet pipe communicating with the casing, a valve arranged within the casing and normally disposed beneath the latter mentioned pipe to be automatically operated at a predetermined interval under the influence of the water introduced into the casing through said pipe, causing said valve to assume a position to cut off the flow of water into the casing through the first mentioned inlet pipe, and a water discharge pipe leading from the casing.

In testimony whereof I affix my signature.

ORRIN RANDOLPH.

Copies of this patent may be obtained for five cents each, by addressing the "Commissioner of Patents, Washington, D. C."